United States Patent
Walker et al.

(10) Patent No.: US 7,376,905 B2
(45) Date of Patent: May 20, 2008

(54) METHOD, SYSTEM, AND COMPUTER PROGRAM PRODUCT FOR USER-SPECIFIED GUI OBJECT DISTRIBUTION

(75) Inventors: Peter A. Walker, Fuquay Varina, NC (US); Joseph R. Winchester, Otterbourne (GB)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 10/326,647

(22) Filed: Dec. 20, 2002

(65) Prior Publication Data

US 2004/0119747 A1 Jun. 24, 2004

(51) Int. Cl.
G06F 3/048 (2006.01)
G06F 17/00 (2006.01)
G09G 5/00 (2006.01)

(52) U.S. Cl. ............ 715/764; 715/770; 715/243; 345/622

(58) Field of Classification Search ........ 715/856, 715/781, 762, 764, 770, 243; 345/619, 622
See application file for complete search history.

(56) References Cited

U.S. PATENT DOCUMENTS

| | | | |
|---|---|---|---|
| 5,202,671 A | 4/1993 | Aranda et al. | |
| 5,263,134 A | 11/1993 | Paal et al. | |
| 5,396,590 A | 3/1995 | Kreegar | |
| 5,426,729 A | 6/1995 | Parker | |
| 5,483,258 A | 1/1996 | Cornett et al. | |
| 5,533,184 A | 7/1996 | Malcolm | |
| 5,548,692 A | 8/1996 | Cok | |
| 5,555,370 A | 9/1996 | Li et al. | |
| 5,642,490 A | 6/1997 | Morgan et al. | |
| 5,649,133 A | 7/1997 | Arquie | |
| 5,704,050 A | 12/1997 | Redpath | |
| 5,710,897 A | 1/1998 | Schneider | |
| 5,721,848 A | 2/1998 | Joseph | |
| 5,812,128 A | 9/1998 | Sterling, IV | |
| 5,973,686 A | 10/1999 | Shimogori | |
| 6,009,198 A * | 12/1999 | Syeda-Mahmood | 382/215 |
| 6,111,573 A | 8/2000 | McComb et al. | |
| 6,246,403 B1 | 6/2001 | Tomm | |
| 6,304,272 B1 | 10/2001 | Schanel et al. | |
| 6,310,631 B1 | 10/2001 | Cecco et al. | |
| 6,335,743 B1 | 1/2002 | Owings | |
| 6,377,285 B1 | 4/2002 | Doan et al. | |
| 6,826,727 B1 * | 11/2004 | Mohr et al. | 715/517 |
| 2003/0048294 A1 * | 3/2003 | Arnold | 345/738 |

OTHER PUBLICATIONS

Microsoft Paint Version 5.1. Copyright 2001.*
"Dynamic Sizing for Graphical Control Objects," *IBM Technical Disclosure Bulletin*, vol. 32, No. 9B (Feb. 1990).

* cited by examiner

Primary Examiner—Kieu D. Vu
Assistant Examiner—Ting Zhou
(74) Attorney, Agent, or Firm—Synnestvedt & Lechner LLP (57) ABSTRACT

An improvement to the known method/system for distribution of elements displayed in GUI windows and similar processing environments is disclosed. A visible, moveable, and size-adjustable bounding box is provided. The user can specify any size for the bounding box and locate the bounding box anywhere in the window. In this manner, the user adjusts the size and location of the bounding box as desired, rather than having to manipulate the various elements to try to define the desired spacing and location.

21 Claims, 10 Drawing Sheets

METHOD, SYSTEM, AND COMPUTER PROGRAM PRODUCT FOR USER-SPECIFIED GUI OBJECT DISTRIBUTION

BACKGROUND OF THE INVENTION

1. Field of the Invention

The present invention relates generally to graphic user interfaces (GUIs) for computer programs and, more particularly, to a method, system, and computer program product for enabling variable distribution of graphics or other objects/elements on a computerized drawing surface such as a GUI window.

2. Description of the Related Art

Graphical user interfaces (GUIs) are routinely employed by software programs operating in data processing systems to simplify their user interfaces or make the software programs "user-friendly". A GUI typically utilizes a "desktop" or "workplace" which is presented to a user via a display screen. In the pervasive windowing-based GUIs used by many operating systems and computer software programs, a user is required to recognize and utilize a myriad of GUI elements or objects. An object is a visual component of a user interface which a user works with to perform a task. An object can appear as text, a pictorial representation (also known as a glyph), or a combination of both. Different types of objects include icons, windows, toolbars, faceplates, buttons, etc. Objects are usually different in different programs, and often change for different desktops in the same program.

A window is an area with visible boundaries within which a user conducts a dialog with a computer system. A window is a GUI element that presents a view of an object, and is typically relatively large. A window makes available different functions to the user, depending upon the type of program with which the window is associated. For example, a drawing program utilized for drawing flowcharts, wiring diagrams, and the like will present the user with a window comprising a "drawing surface". In a software development tool, the window might be referred to as a graphical editor surface, a visual design canvas, or a WYSIWIG preview surface.

GUIs allow users to manipulate the location of elements in the desktop using a technique known as "drag and drop". By manipulating a mouse and a mouse button, users are able to drag one or more elements (e.g., icons, objects drawn with a drawing program, photographic images, etc.) to new locations within the desktop, where they are "dropped". If desired, several objects can be designated for moving at one time, e.g., by "clicking" on the elements while holding down the "Ctrl" key on the keyboard. Once all desired elements are designated for moving, a right-click operation allows the designated elements to be dragged and dropped to a new location.

It is often desirable to distribute elements displayed in the window uniformly, e.g., for ease of use and/or for organizational or aesthetic reasons. For example, the icons displayed on a desktop can get so large in quantity that what is known as the "messy desktop" scenario becomes a problem, and a user may wish to tidy up the desktop. Similarly, in a drawing program, for example, it may be desirable to align two or more drawn images so that they are centered along a same axis or so they are spaced apart evenly. This alignment is generically known as distribution and the axis can be either vertical, horizontal, or both. The example described below is for vertical distribution along the vertical or "y" axis, but it can be applied equally to horizontal distribution along the horizontal or "x" axis.

To avoid the need to manually move each object and align it with precision in the desired location, automatic methods for doing this arranging were developed. On a Windows desktop, for example, a user may select a menu or toolbar option which allows the desktop icons to be arranged alphabetically, by date, file size, file type, etc., and be evenly spaced and distributed in alignment with an edge of the desktop window. Similarly, with respect to drawing programs, automatic selections exist which allow the designation of objects in the drawing window and their automatic alignment, spacing, etc.

The prior art automatic alignment/distribution systems described above rely on a concept known as "bounding box" distribution. In bounding box distribution, the elements to be distributed are conceptually "enclosed" in a box that is invisible on the computer screen. The box is either equal in size to the entire computer screen or, if elements are selected for inclusion in the distribution, its dimensions are defined by the outermost elements around which the imaginary or virtual box is to be formed. The sides of the bounding box define the area in which the elements will be distributed. The size of the box is not determined by the user but is instead defined by the position of the elements, and the box itself is invisible.

While this method functions sufficiently, it is not without its drawbacks. For example, to change the area of the window in which the elements will be distributed (and thus, albeit unknowingly, change the size of the invisible bounding box), the user must manipulate the elements themselves. Further, if no graphics are selected, the elements will be distributed within the bounds of the entire drawing surface as noted above.

Accordingly, it would be desirable to have a method for distributing icons in which the size of the bounding box was selectable without regard to the positioning of any of the elements within the window.

SUMMARY OF THE INVENTION

The present invention is an improvement to the known element distribution process used in GUI windows and similar processing environments. In accordance with the present invention, a visible and size-adjustable bounding box is provided. The user can specify any size for the bounding box and locate the bounding box anywhere in the window. In this manner, the user adjusts the size and location of the bounding box as desired, rather than having to manipulate the various elements to try to define the desired spacing and location.

DETAILED DESCRIPTION OF THE PREFERRED EMBODIMENTS

Figure 1:
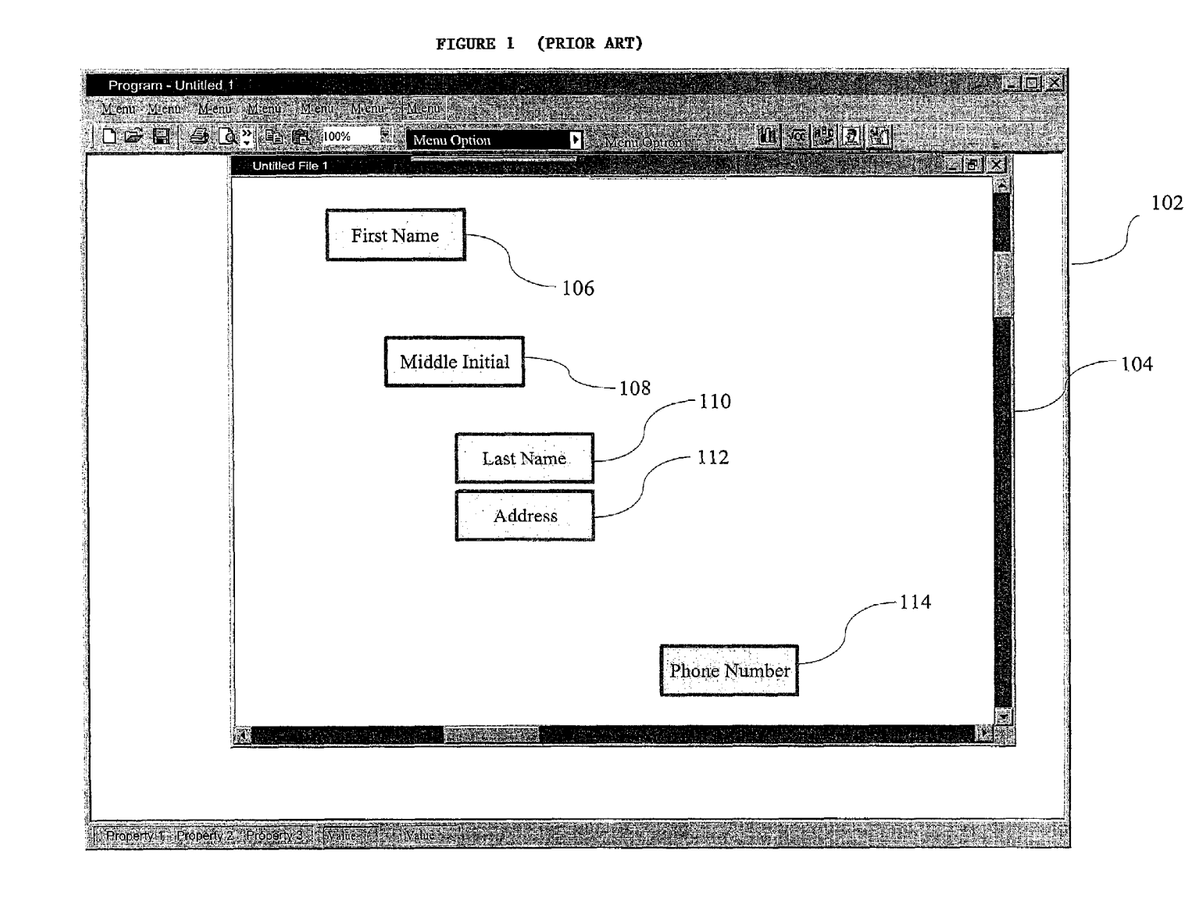
FIG. 1 is a view of a prior art GUI window, showing a series of elements unevenly distributed in the window.

To better understand the present invention it is important to understand how bounding box distribution functions in the prior art. FIGS. 1, 2A, 2C, 3, 4, 5A, 5B, and 5C illustrate the operation of a typical prior art GUI and automatic distribution of elements displayed in the GUI using a prior art invisible bounding box. Referring to FIG. 1, a GUI window or shell 102 displays an active surface 104 in which plural elements 106-114 are displayed. The exact nature of the program being displayed in active surface 104 is unimportant; of importance is the fact that the elements 106-114 can be manipulated, moved, sized, etc. using well known mouse or keyboard commands. A typical application that can perform these manipulations would be, for example, a drawing program such as Paint Shop Pro® by Jasc Software, slide preparation and presentation software such as Freelance Graphics® by Lotus, or document publishing software such as Adobe Acrobat®.

As can be seen in FIG. 1, element 106 is a rectangular box for display of a first name; element 108 is a rectangular box used for display of a middle initial; and element 110 is a rectangular box for display of a last name, element 112 is a rectangular box for display of an address; and element 114 is a rectangular box for display of a phone number. The elements are distributed in active surface 104, with element 106 being near the top left of active surface 104 and element 114 being on the bottom, towards the right of active surface 104. Elements 110 and 112 are close in proximity to each other, and element 108 is approximately midway between element 106 and 110.

Figure 3:
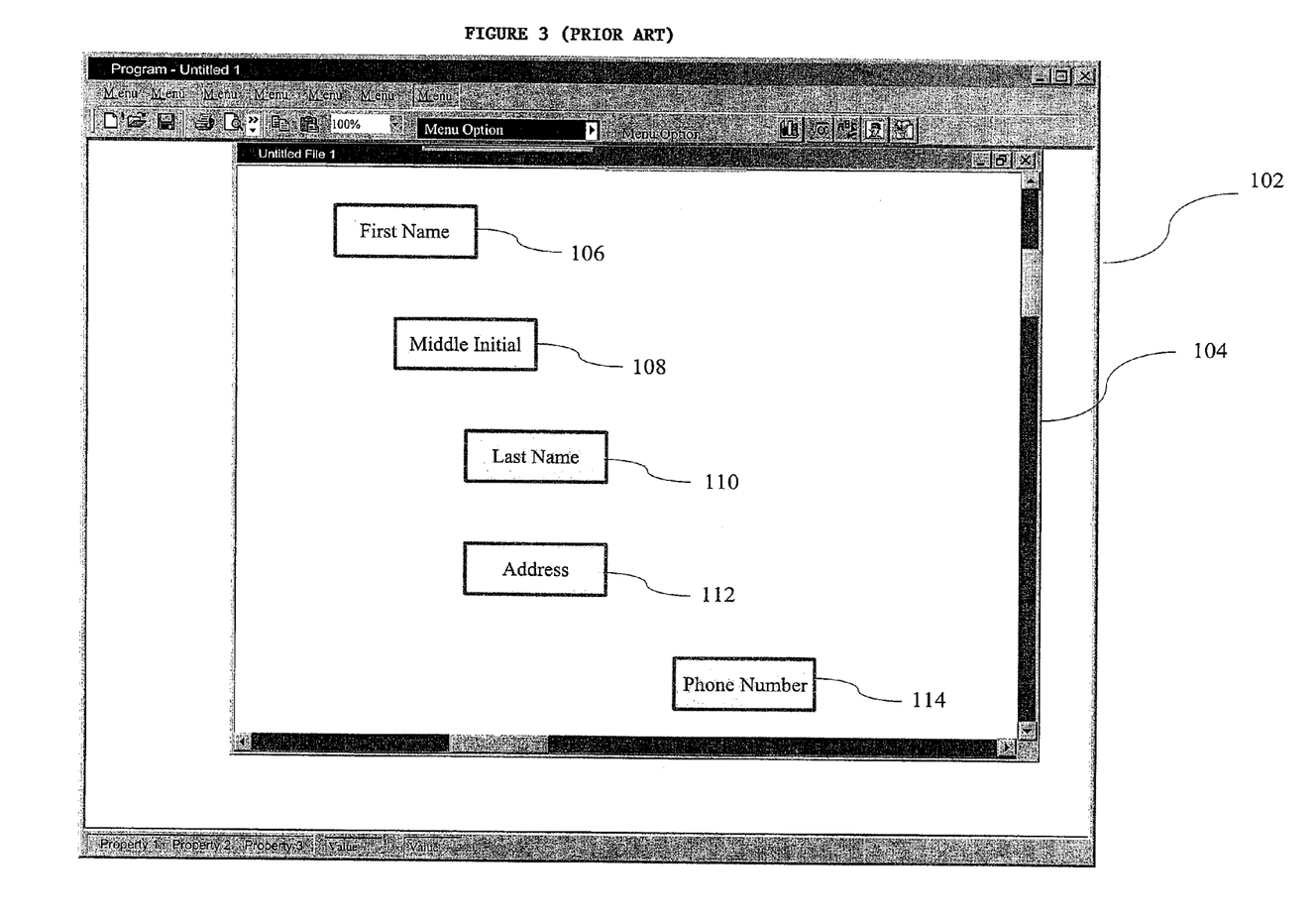
FIG. 3 illustrates a prior art target distribution in which the elements displayed in FIG. 1 are evenly spaced apart, along an axis vertical with respect to the GUI window.

A user of the program may wish to evenly distribute the elements, in the vertical direction, across the active surface 104. FIG. 3 illustrates the same window and elements of FIG. 1, but with the elements distributed as desired by the user, referred to herein as the "target distribution". As can be seen in FIG. 3, the desired target distribution has element 108 moved slightly up and elements 110 and 112 no longer in a closer proximity to each other than any of the other elements. Each of the elements is approximately the same distance from adjacent elements, in the vertical direction.

Using the prior art systems there are three ways of achieving the target distribution illustrated in FIG. 3. First, the user may drag each of the elements to the desired position using the drag and drop features of a mouse. While this will work, it is difficult for a user, without gridlines and screen-displayed rulers, to position the elements with any exactitude.

Figure 2A:
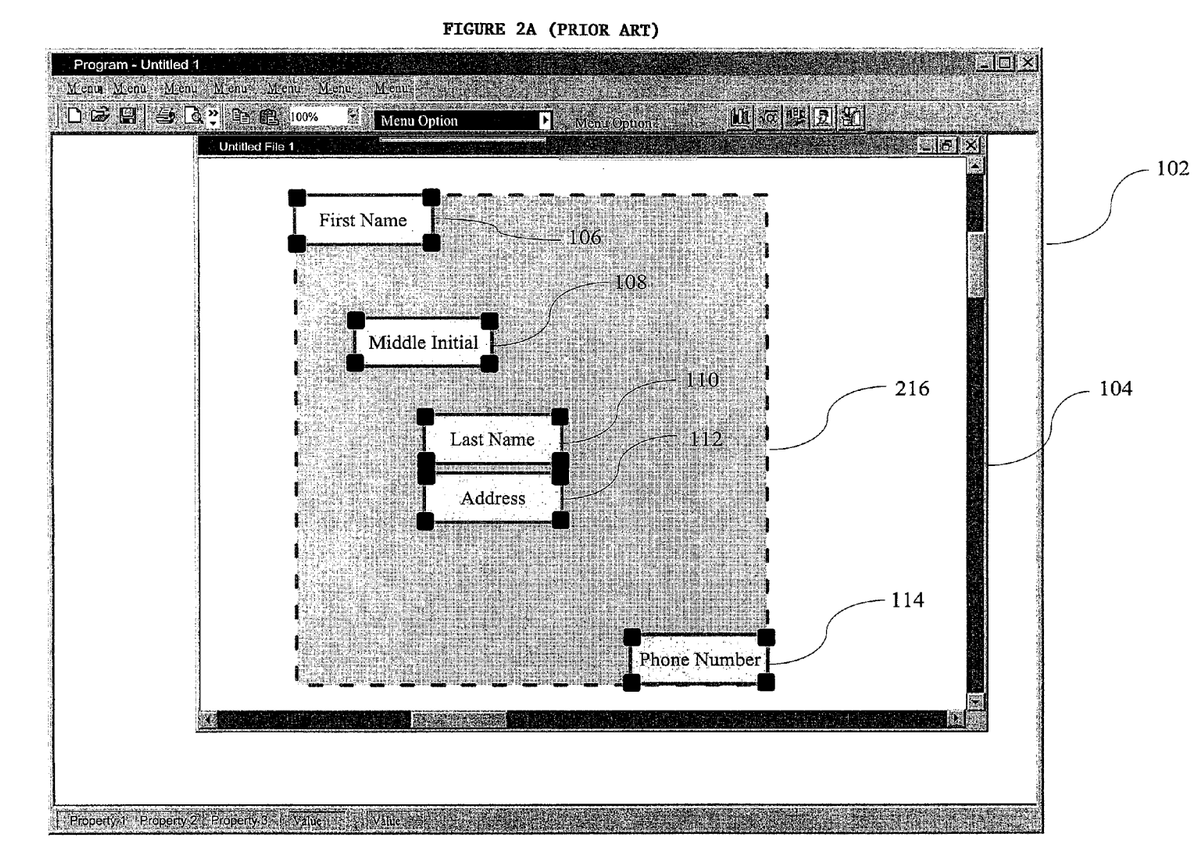
FIG. 2A is a view of the GUI illustrated in FIG. 1, showing the invisible bounding box of the prior art.
Figure 2B:
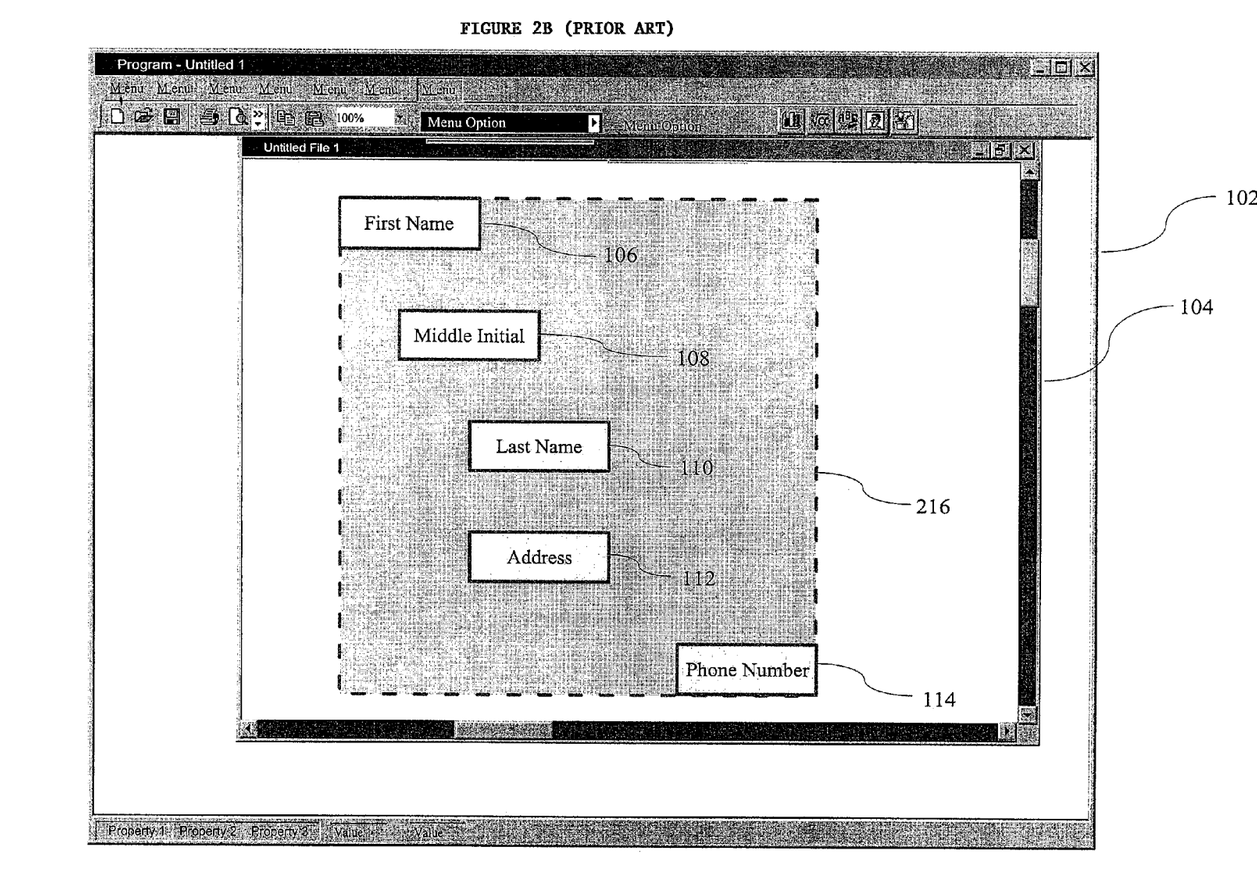
FIG. 2B is a view of the prior art GUI illustrated in FIG. 1, after a distribution selection has been selected and executed.

An alternative method is illustrated in FIGS. 2A and 2B. Referring now to FIG. 2A, a user may designate the elements to be distributed using the well known designation function whereby the user holds down the Ctrl key on the keyboard and then right clicks on each element desired to be part of the distribution with the mouse pointer. In FIG. 2A, the user has clicked on each element 106, 108, 110, 112, and 114, as indicated by the selection handles in the corner of each designated box.

An invisible bounding box 216 automatically is formed, using the outermost elements in the X and Y directions to define the size and location of the four sides of the bounding box 216. For example, element 106 is the uppermost and left-most element with respect to the active surface 104, and element 114 is the lowermost and right-most element. Thus, as can be seen, bounding box 216 has its upper boundary and left boundaries coincident with the upper and left sides of element 106, and its right and lower boundaries coincident with the right and lower sides of element 114.

Of significance is the fact that bounding box 216 is completely transparent to the user; the user simply knows that the elements have been designated and that the distribution, when selected from a menu option, will be performed relative to the selected elements.

The function of distributing the elements in this manner is activated by selection of a menu or toolbar option (not shown but well known in the art). The user simply designates the items to be distributed, selects a menu option for vertical, even distribution (e.g., "distribute evenly in the vertical direction"), and using the boundaries defined by the transparent bounding box 216, the elements are distributed, as shown in FIG. 2B. As can be seen in FIG. 2B, elements 110 and 112 are separated by a greater distance than they were in FIG. 2A, and in fact, the distance between adjacent elements is now identical. The view that the user sees upon completion of the distribution is the same as the target view shown in FIG. 3.

The third method is similar to this method, except that the user does not designate any elements but instead just requests that the items on the screen in their entirety be distributed, relative to the active surface 104. In this case, the system defaults to using the boundaries of the active surface 104 as the bounding box; therefore, if the view shown in FIG. 1 were selected for this process, the transparent bounding box would coincide with active surface 104, and element 106 would be moved up to be flush with the top of active surface 104, element 114 would be moved down to be flush with the bottom of active surface 104, and elements 108, 110 and 112 would be distributed evenly in the vertical direction within active surface 104.

Figure 4:
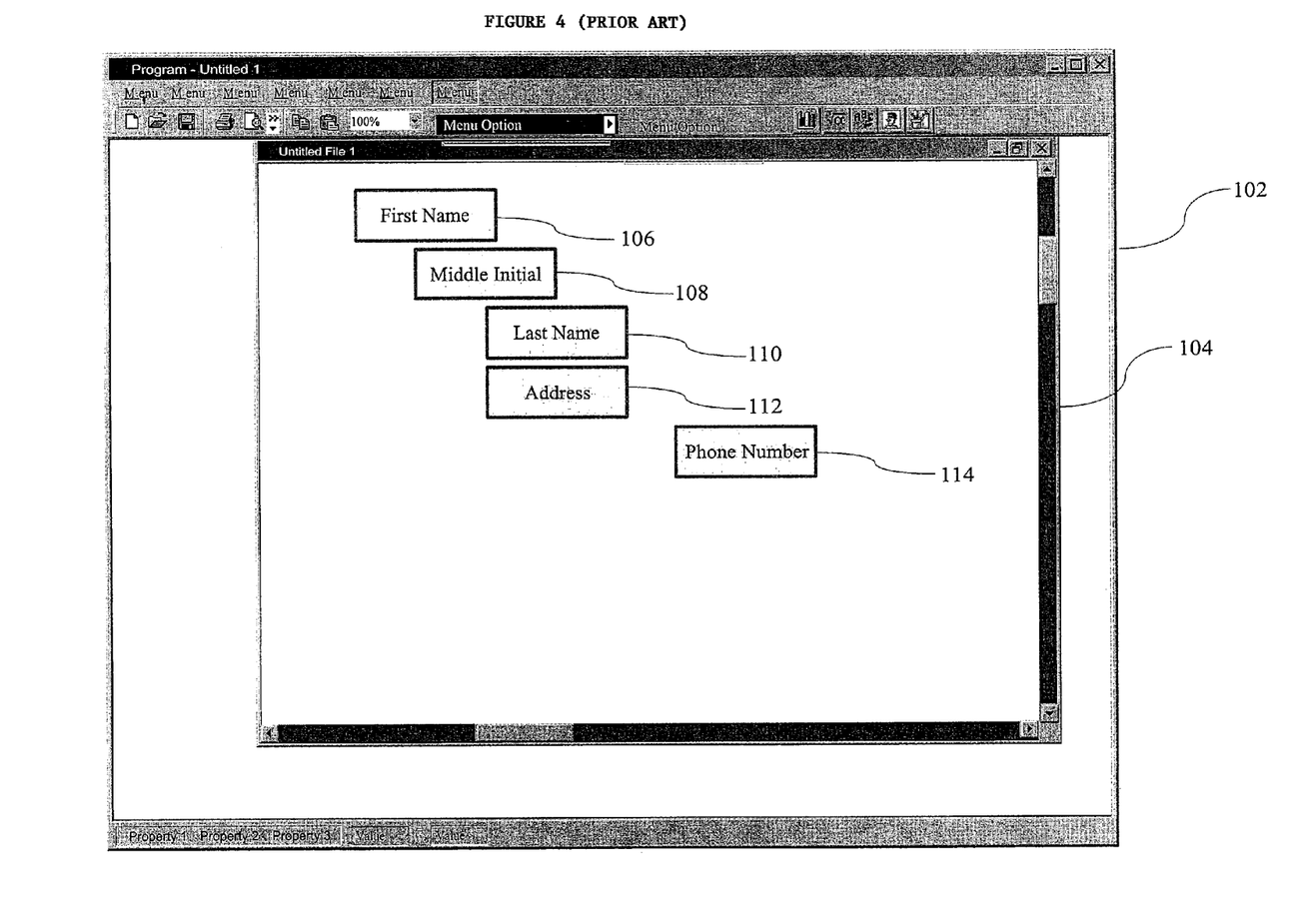
FIG. 4 illustrates an alternative target distribution of the prior art.
Figure 5A:
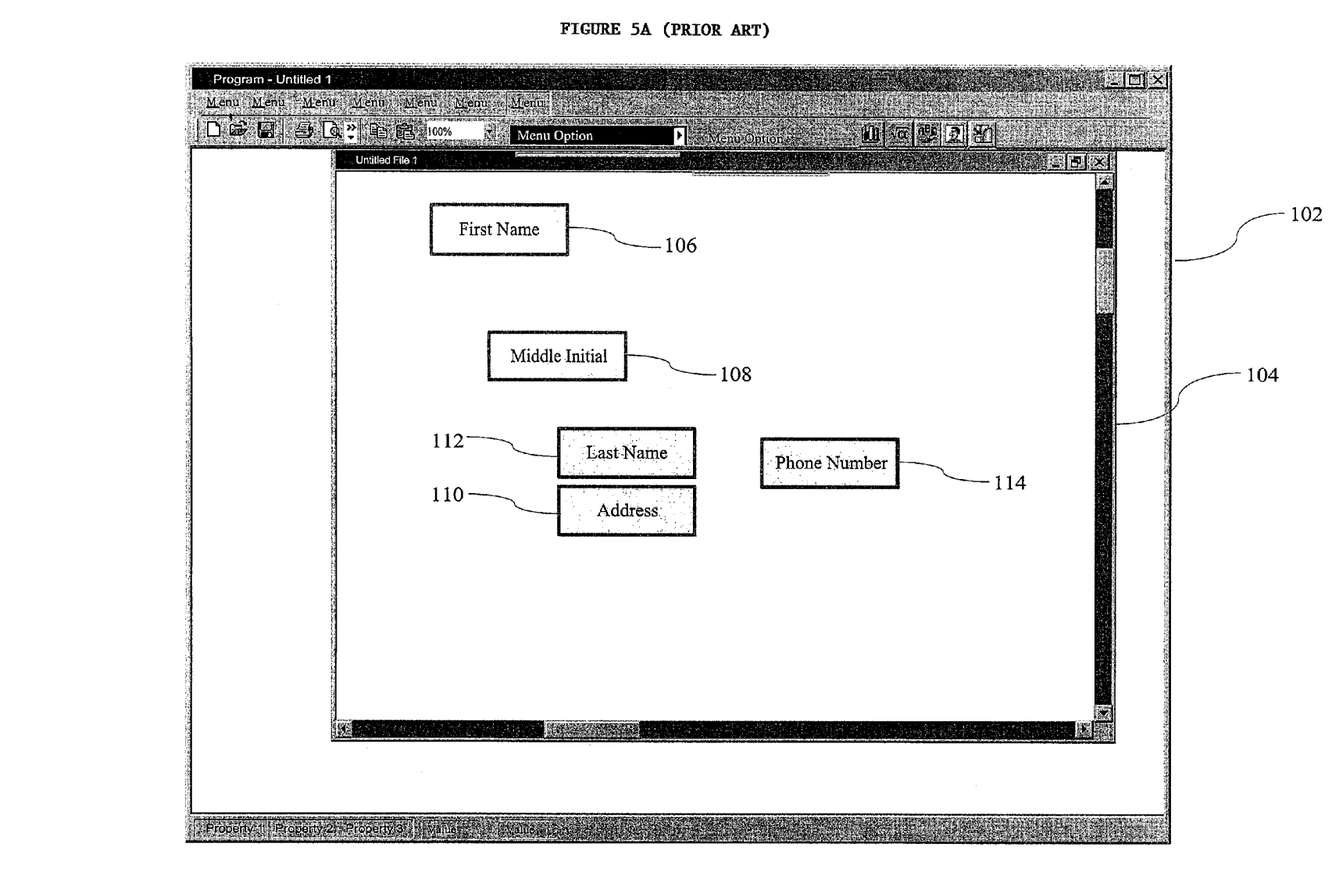
FIGS. 5A-5C illustrate a method of achieving the target distribution of FIG. 4 using the method of the prior art.
Figure 5B:
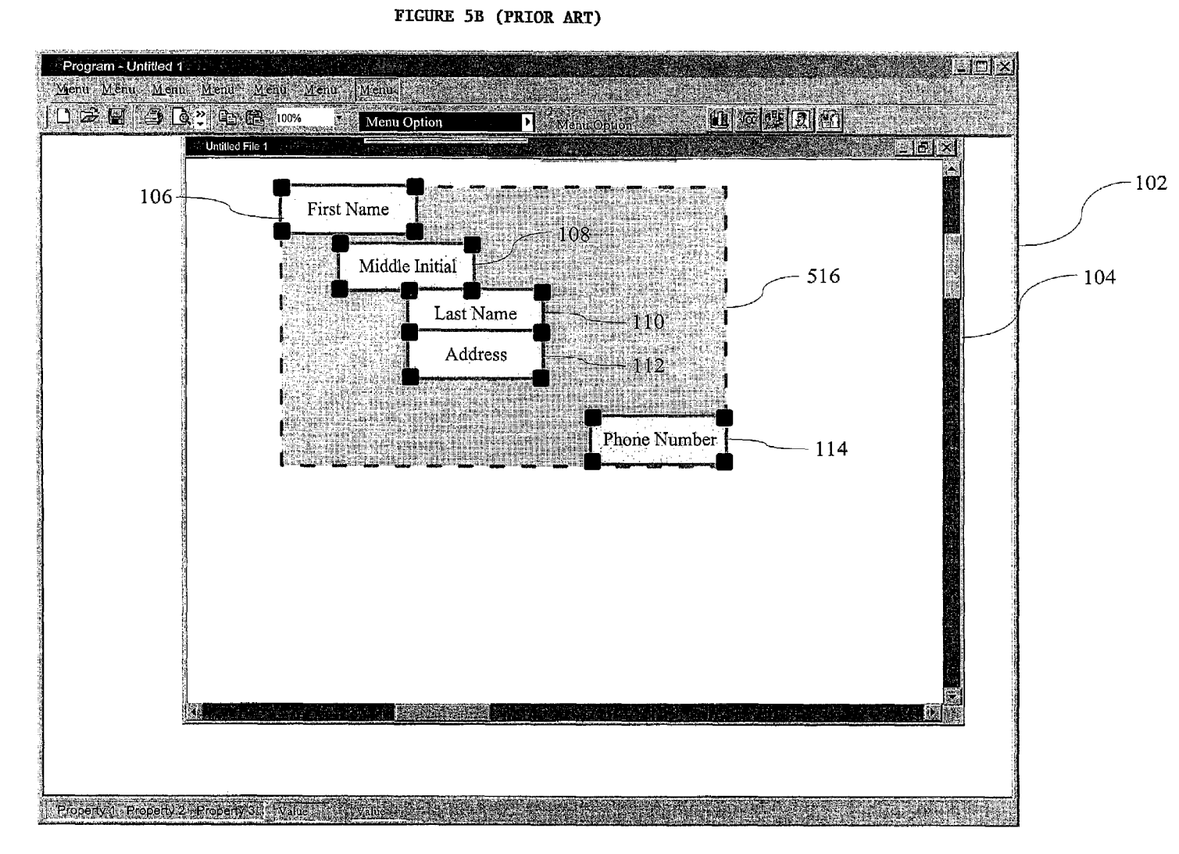
Figure 5C:
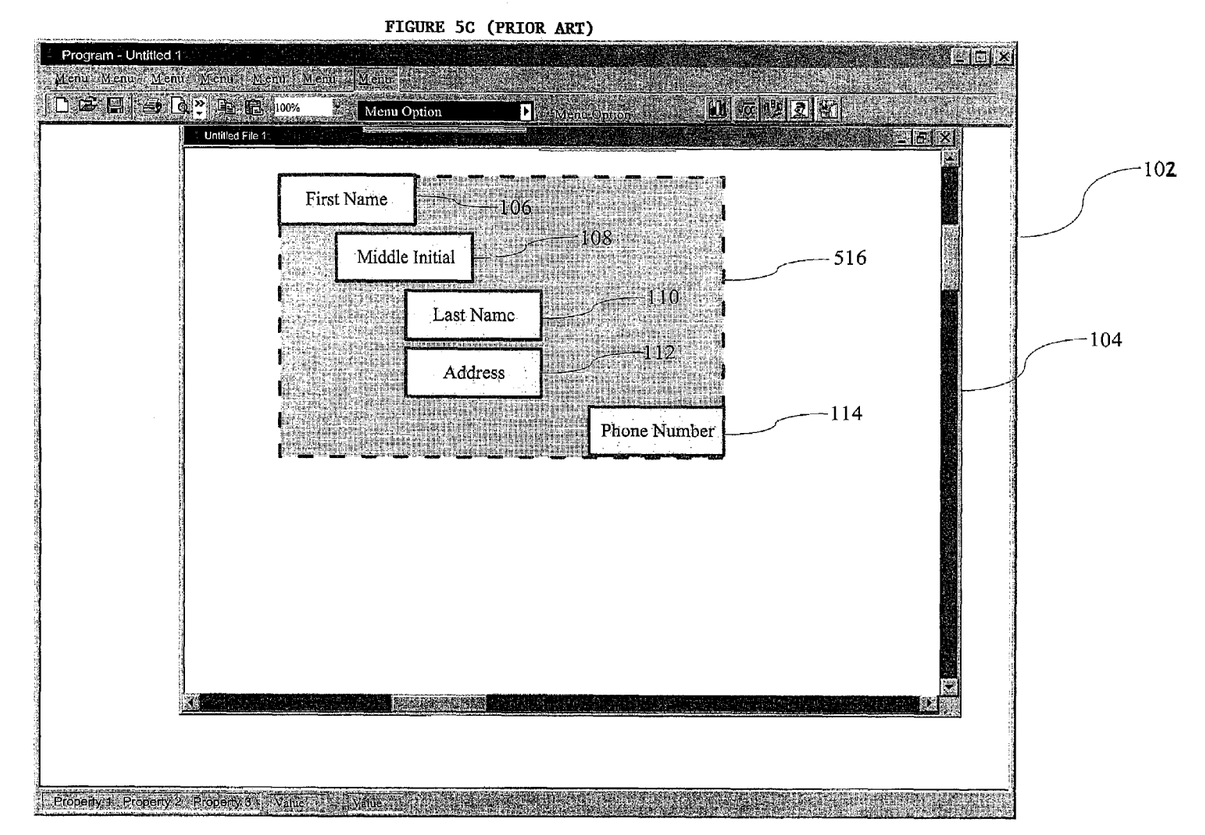

As noted above, the above described prior art methods function adequately. However, there is little flexibility in setting the size of the bounding box, since it is automatically defined by the outermost elements in the active surface. The inadequacy of this method is illustrated in connection with FIGS. 5A-5C. FIG. 4 illustrates a target distribution different from that of FIG. 3. Specifically, in FIG. 4, element 114 is approximately centered in the vertical plane, and elements 108, 110, and 112 are evenly spaced from each other and between elements 114 and 106. Element 106 is slightly below the top of active surface 104. If the user were to manually move element 114 to the position shown in FIG. 5A (vertically centered on the screen), and then were to designate each of the elements 106 through 114 for distribution, since element 112 is now the outermost element on the bottom edge of a boundary box that would be used to redistribute the elements, the target distribution of FIG. 4 will be not be achieved. Instead, element 112 would be on the bottom and element 114 would be above element 112, between element 112 and element 110. Alternatively, the user could manually move elements 108, 110, and 112 into the position shown in FIG. 5B, and then activate the distribution feature of the active surface. However, this requires additional steps. As shown in FIG. 5C, once the distribution feature is activated, the elements will line up as desired.

Figure 6:
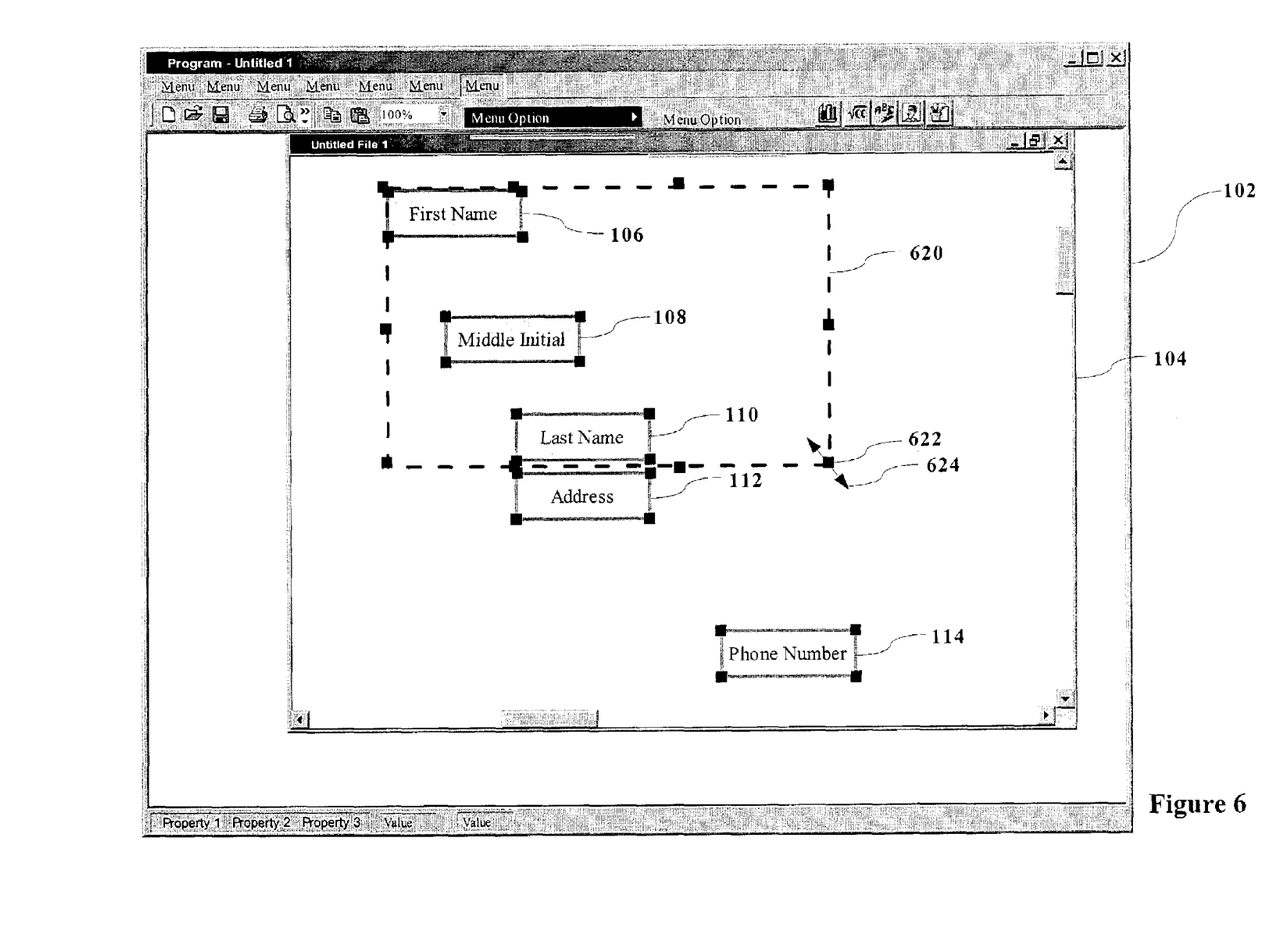
FIG. 6 illustrates the visible, adjustable bounding box in accordance with the present invention.

FIG. 6 illustrates the novel method and operation of the present invention. As can be seen in FIG. 6, the positioning of elements 106 through 114 are identical to their positioning in FIG. 1, i.e. they are in a starting position that is not in conformance with the target distribution illustrated in FIG. 4. In accordance with the present invention, the user designates elements for redistribution, and in doing so, a visible, movable, and re-sizable bounding box 620 is displayed in the active surface 104. By activating an adjustment handle 622, an adjustment arrow 624 is displayed, giving the user the ability to resize the visible bounding box in a well-known manner. In accordance with the present invention, the user simply sizes the bounding box 620 to the desired size, moves it to the desired location in the active surface 104, and then selects an option from a selectable list (e.g., a toolbar, drop-down menu, etc., not shown) that is displayed to redistribute the elements as desired.

For example, by placing the visible bounding box 620 as shown in FIG. 6, and then selecting the previously described "distribute evenly in the vertical direction" menu option, the elements 106 through 114 will be redistributed to position each within the bounding box 620, in the same order in which they appear in FIG. 6. In other words, element 106 will remain the outermost top and left side elements, and element 114 will remain the lowermost bottom and right side element, and elements 108 through 112 will be positioned there between. This results in achieving the target distribution illustrated in FIG. 4.

The user is given visible feedback regarding the positioning of the redistributed elements and the size of the bounding box in which the elements will be distributed, and can make adjustments before distributing the elements. This is in contrast to the prior art, which provides the use with no feedback regarding the size and location of the bounding box and requires a significant amount of trial and error to achieve the same result as the present invention.

Figure 7:
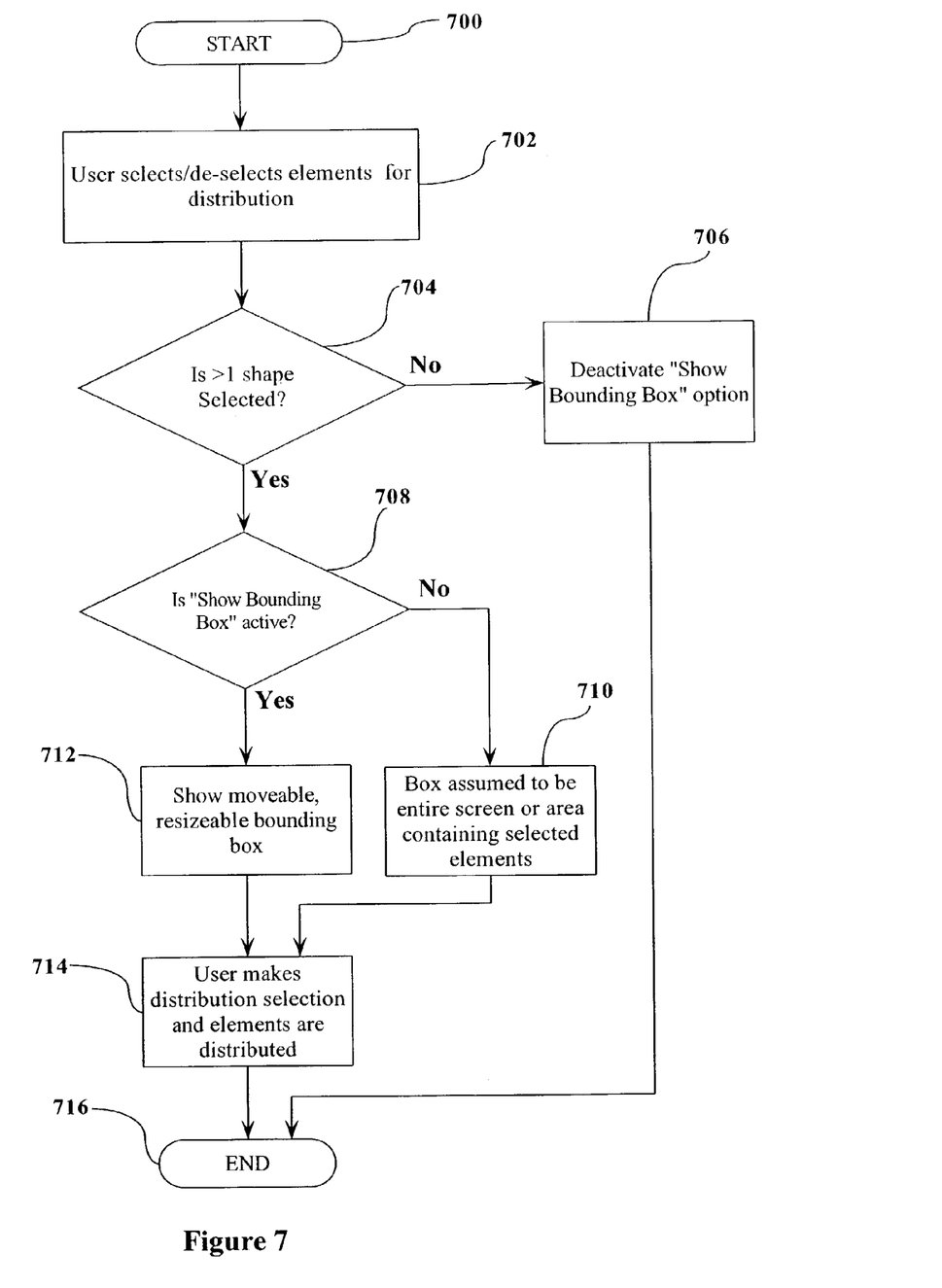
FIG. 7 is a flowchart illustrating an example of steps performed in accordance with the present invention to achieve the novel method/system/computer program product.

FIG. 7 is a flow chart illustrating the steps of the present invention. Referring to FIG. 7, the process begins at Step 700. At Step 702, the user selects or deselects elements in the active surface for distribution. All of the elements may be selected or only certain of the elements may be selected. At Step 704, determination is made as to whether or not multiple shapes have been selected. If the number of shapes selected is not greater than one, then at Step 706, the "show bounding box" option is deactivated and the process ends at Step 716. If, however, at Step 704, it is determined that more than one shape has been selected, then at Step 708, the "show bounding box" is set for active, thereby causing the visible bounding box 620 of FIG. 6 to appear in the active surface. By default, if desired, the visible bounding box 620 can be automatically set to include all selected elements within its confines. Obviously, however, since visible bounding box 620 is adjustable, this is not a necessary step, but merely for convenience.

If at Step 708 it is determined that the "show bounding box" is not active, then the process proceeds to Step 710, where an assumption is made that the entire screen or area containing the selected elements is to be used for distribution. This essentially means that, if a user has not selected the "show bounding box" option, then the process reverts to the prior art methods. If, however, at Step 708, it is determined that the "show bounding box" is active, then at Step 712, the bounding box is displayed on the screen, and the user is free to resize it and/or move it around the screen until the screen is the appropriate size and in the desired location for the user.

At Step 714, the user then makes the distribution selection (e.g. "distribute evenly in the vertical direction" or other distribution options) and at Step 716 the process ends.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation running the GUI described herein. In a client/server environment, such software programming code may be stored with storage associated with a server. The software programming code may be embodied on any of a variety of known media for use with a data processing system, such as a diskette, or hard drive, or CDROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the Figures, and in particular, FIGS. 6 and 7, support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for distributing objects in a predetermined area within a GUI display area, comprising the steps of:
    selecting one or more objects for distribution;
    creating an adjustable bounding box and displaying said adjustable bounding box in said GUI display area;
    adjusting said bounding box to define said predetermined area within said GUI display area;
    wherein at least one of the selected objects is located outside of the adjusted bounding box; and
    executing a distribution command, whereby said one or more selected objects are distributed in said bounding box based on said distribution command, including moving a selected object that was located outside of adjusted bounding box into the bounding box.

2. The method of claim 1, wherein said adjusting step comprises at least the step of:

changing the size of said adjustable bounding box.

3. The method of claim 2, wherein said adjusting step further comprises at least the step of:
changing the location of said adjustable bounding box within said GUI display area.

4. The method of claim 3, wherein said executing step comprises at least the steps of:
invoking a selectable list displaying one or more distribution options;
selecting one of said options; and
executing said selected one of said options.

5. The method of claim 4, wherein said one or more distribution options include spacing said selected objects evenly within said adjustable bounding box.

6. The method of claim 4, wherein said one or more distribution options include aligning said selected objects vertically or horizontally within said adjustable bounding box.

7. The method of claim 1, wherein said adjusting step comprises at least the step of:
changing the location of said adjustable bounding box within said GUI display area.

8. A system for distributing objects in a predetermined area within a GUI display area, comprising:
means for selecting one or more objects for distribution;
means for creating an adjustable bounding box and displaying said adjustable bounding box in said GUI display area;
means for adjusting said bounding box to define said predetermined area within said GUI display area,
wherein at least one of the selected objects is located outside of the adjusted bounding box; and
means for executing a distribution command, whereby said one or more selected objects are distributed in said bounding box based on said distribution command, including moving a selected object that was located outside of adjusted bounding box into the bounding box.

9. The system of claim 8, wherein said adjusting means comprises:
means for changing the size of said adjustable bounding box.

10. The system of claim 9, wherein said adjusting means further comprises:
means for changing the location of said adjustable bounding box within said GUI display area.

11. The system of claim 10, wherein said executing means comprises:
means for invoking a selectable list displaying one or more distribution options;
means for selecting one of said options; and
means for executing said selected one of said options.

12. The system of claim 11, wherein said one or more distribution options include spacing said selected objects evenly within said adjustable bounding box.

13. The system of claim 11, wherein said one or more distribution options include aligning said selected objects vertically or horizontally within said adjustable bounding box.

14. The system of claim 8, wherein said adjusting means comprises:
means for changing the location of said adjustable bounding box within said GUI display area.

15. A computer program product recorded on computer readable medium for distributing objects in a predetermined area within a GUI display area, comprising:
computer readable means for selecting one or more objects for distribution;
computer readable means for creating an adjustable bounding box and displaying said adjustable bounding box in said GUI display area;
computer readable means for adjusting said bounding box to define said predetermined area within said GUI display area,
wherein at least one of the selected objects is located outside of the adjusted bounding box; and
computer readable means for executing a distribution command, whereby said one or more selected objects are distributed in said bounding box based on said distribution command, including moving a selected object that was located outside of adjusted bounding box into the bounding box.

16. The computer program product of claim 15, wherein said computer readable adjusting means comprises:
computer readable means for changing the size of said adjustable bounding box.

17. The computer program product of claim 16, wherein said computer readable adjusting means further comprises:
computer readable means for changing the location of said adjustable bounding box within said GUI display area.

18. The computer program product of claim 17, wherein said computer readable executing means comprises:
computer readable means for invoking a selectable list displaying one or more distribution options;
computer readable means for selecting one of said options; and
computer readable means for executing said selected one of said options.

19. The computer program product of claim 18, wherein said one or more distribution options include spacing said selected objects evenly within said adjustable bounding box.

20. The computer program product of claim 18, wherein said one or more distribution options include aligning said selected objects vertically or horizontally within said adjustable bounding box.

21. The computer program product of claim 15, wherein said computer readable adjusting means comprises:
computer readable means for changing the location of said adjustable bounding box within said GUI display area.

* * * * *